Nov. 18, 1952   A. T. ONSRUD   2,618,168
HAND-OPERATED CLUTCH CONTROL
Filed Feb. 6, 1950
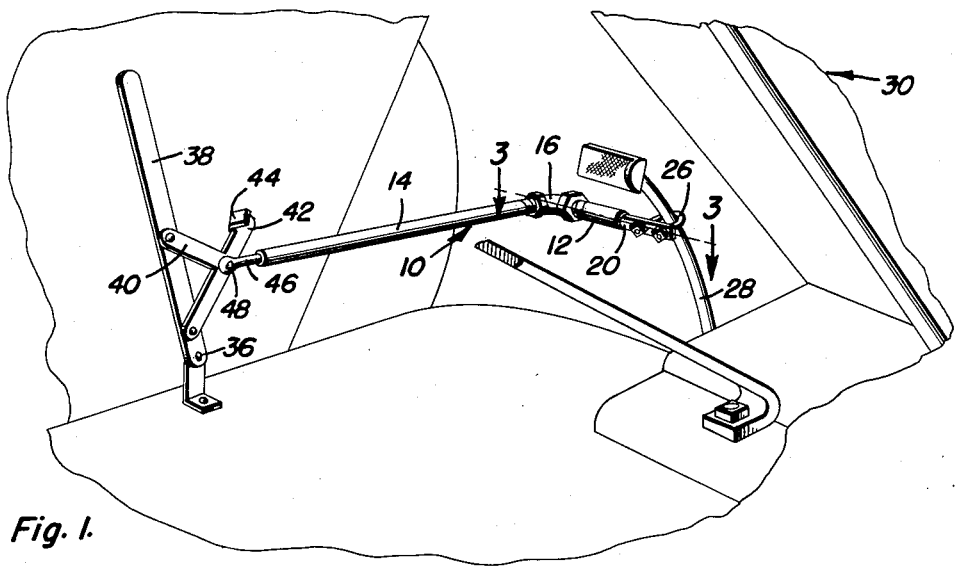
Fig. 1.
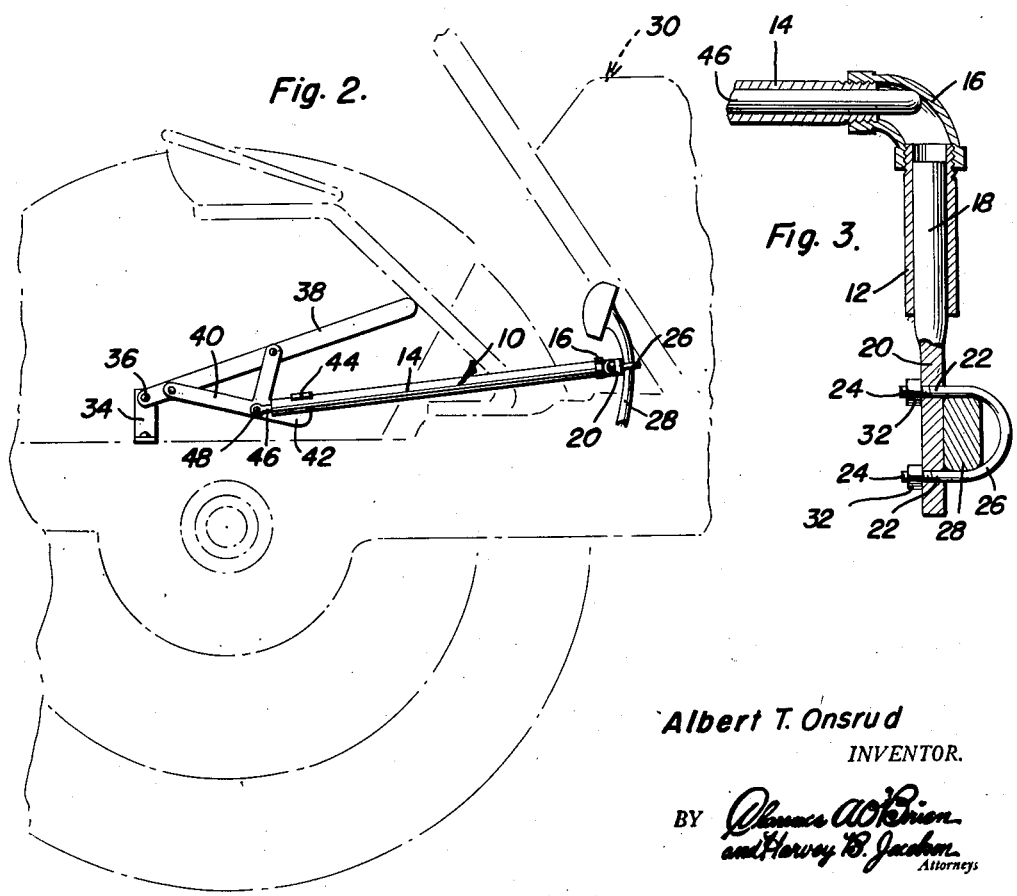
Fig. 2.
Fig. 3.
Albert T. Onsrud
INVENTOR.

Patented Nov. 18, 1952

2,618,168

UNITED STATES PATENT OFFICE 2,618,168

HAND-OPERATED CLUTCH CONTROL

Albert T. Onsrud, Stoughton, Wis.

Application February 6, 1950, Serial No. 142,633

6 Claims. (Cl. 74—481)

This invention relates to a hand operated clutch control for tractors and the like, and the primary object of the present invention is to provide a device mounted upon a tractor and attached to the clutch pedal of a tractor so that the tractor clutch pedal may be operated by hand without the operator having to climb into the driver's seat in order to move the clutch pedal by foot power.

Another very important object of the present invention is to provide a hand operated clutch control for tractors whereby the clutch pedal may be quickly and readily actuated by an operator standing or walking beside the tractor, thereby permitting the operator to precede the tractor to open gates and the like without having to climb down from the tractor seat.

Yet another object of the present invention is to provide a device of the aforementioned character whereby the clutch pedal of a tractor may be hand operated, however, one that will not prevent foot operation of the clutch pedal when desired.

A further object of the present invention is to provide a hand operated clutch control that with slight modification is adaptable for all makes of tractors or farm implements.

A still further aim of the present invention is to provide a hand operated clutch pedal operator that is simple and practical in construction, strong and reliable in use, small and compact in structure, durable in operation, relatively inexpensive to manufacture and install, and otherwise well adapted for the purposes for which the same is intended.

Other objects and advantages reside in the details of construction and operation as more fully hereinafter described and claimed, reference being had to the accompanying drawings forming part thereof, wherein like numerals refer to like parts throughout, and in which:

Figure 1 is a fragmentary perspective view of a tractor and showing the present invention applied to the tractor clutch pedal;

Figure 2 is a side elevational view of Figure 1, showing the tractor in dotted lines and the present invention and clutch pedal in full lines with the clutch pedal and its declutching position; and, Figure 3 is an enlarged detail sectional view taken substantially on the plane of section line 3—3 of Figure 1.

Referring now to the drawings in detail, wherein for the purpose of illustration, there is disclosed a preferred embodiment of the present invention, the numeral 10 represents a substantially L-shaped member composed of a tubular shorter leg or section 12, a tubular longer leg or section 14 and an elbow 16 joining the sections 12 and 14.

An attaching arm 18 is fitted in the section 12 and includes an outwardly projecting, relatively flat portion 20 having spaced apertures 22 for receiving the threaded ends 24 of a U-bolt or clamping bolt 26. The bolt 26 embraces the clutch pedal 28 of a tractor 30 and clamps the pedal 28 against the portion 20 when the nuts 32 threaded on the ends 24 are tightened.

An angle member or support 34 is suitably mounted on the tractor, or tractor seat, rearwardly of the clutch pedal 28 and is pivoted, as at 36, to the lower end of a vertically swingable lever 38 that is movable in an arc toward and away from the clutch pedal 28. A support member 40 forms part of the lever 38 and projects laterally from the lever 38. This support member 40 includes a finger portion 42 having a laterally projecting stop 44 that overlies the section 14.

One end of an arm or rod 46 is pivoted, as at 48, the support member 40 and the arm 46 is slidably received in the section 14.

In practical use of the present invention, the clutch pedal 28 is in its clutching position when the lever 38 is raised as shown in Figure 1. As the lever 38 is lowered toward the clutch pedal 28, by an operator standing beside the tractor, the rod 46 is moved forwardly until it strikes the abutment or elbow 16, at which time the member 10 and clutch pedal 28 will be moved forwardly and downwardly with the lever 38.

When the lever 38 is lowered sufficiently to move the clutch pedal 28 to its declutching position, see Figure 2, the stop 44 contacts the section 14 to prevent a user's hand contacting the section 14. The pivot 48 is so located that when it is disposed below the pivot 36, the lever 38, member 10 and clutch pedal 28 will remain depressed until the lever is again manually raised.

By employing the slidable connection (parts 14 and 46) between the clutch pedal 28 and the lever 38, sufficient lost motion is present to permit the operator to actuate the clutch pedal by foot power without appreciable movement of the lever 38.

When the instant invention is attached to a seat frame, on certain type tractors, the member 40 will be fastened on the outside of the lever 38 so that the seat frame will not interfere with the operation of the lever.

It has previously been described that the rod 46 will strike the elbow 16 before the member 10 and clutch pedal 28 will be moved forwardly and downwardly with the lever 38. This operation may also be accomplished by lowering lever 38 to cause pivot 48 to come into contact with member 10, to cause, in turn, member 10 and clutch pedal 28 to move forwardly and downwardly with lever 38. The invention can be operated in either of the above described manners, although rod 46 must be made longer if elbow 16 is to serve as an abutment for the rod. In that case, rod 46 must be long enough to come into contact with elbow 16 before member 10 and clutch pedal 28 will move.

Having described the invention, what is claimed as new is:

1. In a vehicle including a clutch pedal, a hand operated clutch control comprising a substantially L-shaped member including a shorter leg and a hollow longer leg, means slidably and adjustably securing the shorter leg of said member to the clutch pedal, a support bracket secured to the floor of a vehicle behind the pedal disposed adjacent the longer leg of said member, a vertically swingable lever pivoted to said support bracket for movement toward and away from the member, and an arm, considerably longer than said longer leg, pivoted to the lever and slidably received in the longer leg of said member, said member including a curved portion joining said shorter and longer legs and constituting an abutment for the arm as the lever is moved toward the member.

2. The combination of claim 1 and means carried by the lever engaging the member to limit pivotal movement of the lever toward the longer leg of said member, and to space the lever from the longer leg of said member and above the floor of the vehicle when the lever is moved to a clutch releasing position.

3. A hand operated clutch control comprising a substantially L-shaped member including a shorter leg and a hollow longer leg, means slidably and adjustably securing the shorter leg of said member to a clutch pedal, a support disposed adjacent the longer leg of said member, a vertically swingable lever pivoted to said support for movement toward and away from the member, and an arm, considerably longer than said longer leg, pivoted to the lever and slidably carried by the longer leg of said member, said member including a curved hollow portion joining the shorter and longer legs constituting an abutment for the arm and disposed in the path of said arm for engaging the arm as the lever is moved toward the member, said means including a clamping bolt mounted on the shorter leg of said member.

4. A hand operated clutch control comprising a substantially L-shaped member including a shorter leg, a longer leg and a curved portion joining said shorter and longer legs, means for attaching the shorter leg of said member to a clutch pedal and including a portion received in said shorter leg, a support disposed adjacent the longer leg of said member, a vertically swingable lever pivoted to said support for movement toward and away from said member, and an arm pivoted to said lever and slidably received in the longer leg of said member for engaging the curved portion to permit movement of the member with the arm and lever.

5. A hand operated clutch comprising a substantially L-shaped member including a shorter leg, a hollow longer leg and a hollow elbow joining said legs, means on said shorter leg for attaching the member to a clutch pedal, a support disposed alongside of said longer leg, a vertically swingable lever pivoted to said support for movement toward and away from said longer leg, a V-shaped member having its ends secured to said lever and including an apex, an arm pivoted to the apex of said V-shaped member and slidably received in said longer leg, and means carried by said V-shaped member and extending from the apex of said V-shaped member toward said longer leg for engaging the latter during swinging movement of the lever toward the longer leg, said arm being considerably longer than said longer leg to engage said elbow during lowering of said lever toward said longer leg.

6. The combination of claim 5, wherein said last named means comprises a finger portion having a laterally projecting stop overlying said longer leg.

ALBERT T. ONSRUD.

REFERENCES CITED

The following references are of record in the file of this patent:

UNITED STATES PATENTS

| Number | Name | Date |
| --- | --- | --- |
| 892,116 | Becker | June 30, 1908 |
| 1,335,631 | Youmans | Mar. 30, 1920 |
| 1,532,969 | Vincent | Apr. 7, 1925 |
| 1,585,855 | Hawn | May 25, 1926 |
| 1,783,324 | Young | Dec. 2, 1930 |
| 1,801,987 | Strand | Apr. 21, 1931 |
| 2,150,972 | Heisler | Mar. 21, 1939 |

FOREIGN PATENTS

| Number | Country | Date |
| --- | --- | --- |
| 505,452 | France | May 7, 1920 |
| 718,990 | France | Nov. 13, 1931 |